United States Patent [19]
Hein

[11] 3,797,245

[45] Mar. 19, 1974

[54] DUAL RANGE PRESSURE DEPENDENT VARIABLE FLOW FLUID DELIVERY SYSTEM

[75] Inventor: Arthur J. Hein, Joliet, Ill.

[73] Assignee: Caterpillar Tractor Co., Peoria, Ill.

[22] Filed: Aug. 25, 1972

[21] Appl. No.: 283,855

[52] U.S. Cl.................................. 60/452, 417/212
[51] Int. Cl............................................ F16h 39/46
[58] Field of Search ....... 60/452, 445; 417/212, 213

[56] References Cited
UNITED STATES PATENTS
2,512,799  6/1950  Huber ................................. 60/452
3,366,064  1/1968  Stephens et al.................. 60/452 X

*Primary Examiner*—Edgar W. Geoghegan
*Attorney, Agent, or Firm*—Fryer, Tjensvold, Phillips & Lempio

[57] ABSTRACT

Using a variable displacement pump as a source of pressurized fluid in a pressurized fluid delivery circuit, the displacement of the pump can be controlled by pressure in the fluid delivery circuit over a first pressure compensated range when work circuits connected thereto are capable of being operated within the first pressure range and also at a second higher pressure compensated range if any work circuit requires a higher pressure by using the pressure above a preselected value in the work circuit to change the range pressure compensation to a higher level through adjustment of control components.

9 Claims, 3 Drawing Figures

DUAL RANGE PRESSURE DEPENDENT VARIABLE FLOW FLUID DELIVERY SYSTEM

BACKGROUND OF THE INVENTION

Variable displacement pumps are often utilized in current machinery since their flow output can be reduced to a minimum when there is no flow requirements in the fluid delivery circuits which they supply while still maintaining a positive pressure in the circuit with minimum horsepower consumption. For example, U.S. Pat. No. 2,835,228 issued to Parr et al illustrates a system in which such a pump is employed and the pressure level in the fluid delivery circuit is employed to control the displacement of the pump. By utilizing pump output pressure to control the displacement of the pump, system operating pressure is maintained when all the work circuits are inactive with near zero displacement of the pump, as it need only replenish the leakage in the delivery circuit to maintain the system pressure. Under such conditions the forces controlling pump displacement are counterbalanced and a reduction in pressure when a work circuit is operated will cause the pump to increase displacement to meet the increased flow demands. This system, as well as the system illustrated in U.S. Pat. No. 3,350,881 issued to D'Amato is often referred to as a pressure compensated delivery system because the output flow is pressure dependent.

Also, since pump displacement can be varied, such systems are less dependent on engine r.p.m. and offer uniform response in work circuits over wide variation of engine speeds. In addition such systems provide faster response as they can be economically operated at a positive pressure at or near operating pressure.

However, in the above systems, operation in a pressure range close to the maximum pressure that any work circuit requires is necessary and unnecessary horsepower is consumed. This is also true of the pump systems disclosed in this assignee's U.S. Pat. Application Ser. No. 157,157, filed June 28, 1971 now U.S. Pat. No. 3,738,779 and U.S. Pat. Application Ser. No. 157,535, filed June 28, 1971 Patent not yet issued, which illustrate a cartridge controlled swash plate axial piston pump, as is generally described herein.

While two level pressure operation for fluid delivery circuits are known in open center type systems, for example see U.S. Pat. No. 3,416,561, issued to Kokaly, such systems are not available in pressure compensated variable flow delivery systems having a positive pressure.

Thus, it is a general purpose of this invention to provide a pressure compensated variable flow fluid delivery system capable of operating at two separate and distinct pressure levels, with full pressure compensation at both levels.

SUMMARY OF THE INVENTION

A dual range pressure compensated flow delivery system includes a driven variable displacement pump having its inlet connected to a source of hydraulic fluid and its outlet connected to a fluid delivery circuit with an actuator controlling the displacement of the pump and a pressure responsive control means communicating with the outlet of the pump operable to control the actuator to adjust pump displacement in proportion to pump output pressure over at least a portion of its displacement in a first preselected pressure range and pressure responsive valve means communicating with the fluid delivery circuit which is operable to adjust the control means so it will adjust pump displacement in proportion to pump output pressure over at least a portion of its displacement at a second preselected pressure range, the second preselected pressure range being higher than the first preselected pressure range.

The pressure responsive valve means may be incorporated downstream of closed center control valves in the fluid delivery circuit so it will not be activated unless a work circuit is actuated which requires a greater pressure in the fluid delivery circuit than is available in the first pressure range where pressure compensation is provided.

DESCRIPTION OF THE DRAWINGS

Referring to FIG. 1, a variable displacement pump 10 is illustrated, which has the conventional components found in an axial-piston type positive displacement pump, along with a special cartridge actuator system 11 composed of a servo cartridge 12 and a slave or compensating cartridge 13. The conventional components of the pump include a drive shaft 14 connected to a prime mover (not shown) driving a cylinder 15 in which are mounted a plurality of longitudinally reciprocating pistons 16. The cylinder is mounted on a valve plate 17 having conventional kidney-shaped ports (one shown in phantom) and the pistons have their projecting ends journalled in separate slippers 18 with a ball and socket attachment. As the slippers rotate with the cylinder, they are supported on a pivoted swash plate 19. When the swash plate is oriented so it is in a radial plane with the cylinder rotating, the pistons will not reciprocate in the cylinder. However, as the swash plate is pivoted (tilted) as shown in FIG. 1, these pistons will reciprocate and draw hydraulic fluid from one kidney-shaped port and discharge it into the other.

Figure 1:
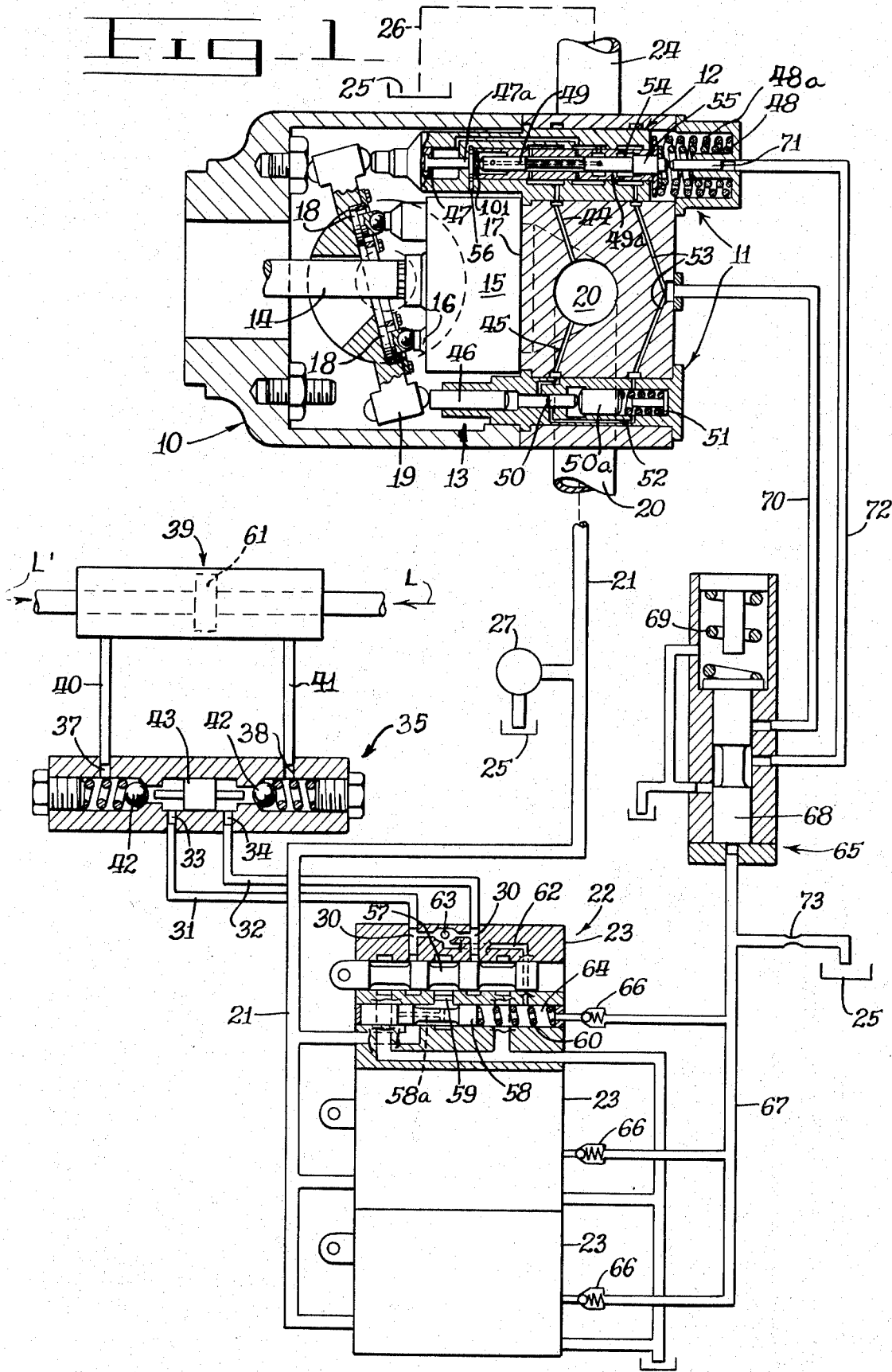
FIG. 1 is a schematic of a new multi-stage pressure compensated fluid delivery system illustrating some of the components therein in section.

From the above description it can be appreciated that the position (tilt) of the swash plate determines the fluid output volume (displacement) of the pump 10. In the embodiment described, the servo-cartridge 12 and the compensating cartridge 13 collectively form the actuator system 11 for the pump. However, the principles of the invention can be applied to actuators exterior of the pump housing and to other positive displacement pumps.

In the instant invention it is the object to control the fluid output of the pump in two distinct pressure ranges, i.e., one range being from 0 – 2,100 psi, and the other range from 2,050 psi to approximately 3,500 psi. Thus, the remainder of the description will be directed to the components employed to reach this objective, as well as those components which illustrate the environment of the invention.

In the latter respect the outlet 20 of the pump is connected by a conduit 21 to the valve bodies 22 of a series of closed center valves 23 and its inlet 24 is in communication with the reservoir 25, as illustrated by broken line 26. With all the valves closed a small amount of fluid will be lost due to leakage and the pump will have a small output flow to hold the pressure at approximately 2,100 psi. A relief valve 27 is connected to conduit 21 and will vent at approximately 3,650 psi to protect the fluid delivery system from rupturing due to over pressures.

Each closed center valve 23 is the same and therefore only one is described and illustrated with its associated fluid components. Ports 30 of the valve 23 are connected to conduits 31 and 32 that respectively put them in communication with the ports 33 and 34 of a conventional lock valve 35, whose associated ports 37 and 38 respectively communicate with opposite sides of a fluid jack 39 through conduits 40 and 41. The valve 35 prevents loads L and L' on the jack from applying fluid pressure through the referenced conduits to the valve 23 because of the ball check valves 42, which are individually displaced by pressure during valve actuation by a pressure actuated shuttle 43, which allows one side of the jack to exhaust when the opposite side is pressurized by under of its associated control valve.

With the aforedescribed system, the cartridges 12 and 13 are employed to control the volumetric flow (displacement) of the pump proportional to pressure by controlling the swash plate position (tilt). In this regard the fluid output pressure from the pump is used with differentially sized actuating surfaces plus spring loadings in the several cartridges to control the swash plate position through communication with the pump outlet 20 via passages 44 and 45.

In this respect pressurized fluid from passage 45 acts directly on plunger 46 to decrease displacement while this same pressure acts directly on plunger 47 through passage 44 (and valving hereinafter described) which is assisted by springs 48 through spool 49 and pin 47a abutting on the outboard end plunger 47 to increase pump displacement. Assuming a low pressure condition, i.e., below 1,700 psi, the swash plate 19 will be in the position illustrated in FIG. 1. As the pressure builds due to full pump output, the force of plunger 46, augmented by the sum of the slipper forces, due to the reaction forces of the pistons 10, will commence to counterbalance spring augmented pressures on plunger 47.

At any pump pressure above atmospheric the two pistons 50 and 50A operate as a pressure reducing valve to maintain a fixed fraction of pump discharge pressure in spring 51 cavity, passages 53 and 70 and chamber 54. Thus, the pump discharge pressure acts on piston 50 area and this force is just balanced by spring 51 force plus the force of reduced pressure in spring 51 cavity acting on end area of piston 50A.

The spring 51 force is relatively small and the fractional ratio of reduced pressure is substantially equal to the area ratios of the pistons 50 and 50A. In the actual circuit the reduced pressure is approximately 1/7 of pump discharge pressure.

In chamber 54 the reduced pump pressure acts on the enlarged land portion 55 to move the servo valve spool 49 against the bias of the inner spring 48, the movement being proportional to reduced pump pressure after the initial bias of spring 48 is overcome. Thus, at 242 psi reduced pressure (1,700 psi discharge pressure) the spool 49 starts to move, at 271 psi reduced pressure (1,900 psi discharge) the spool 49 is half way toward zero displacement position, and at 300 psi reduced pressure (2,100 psi discharge) the spool 49 is at the zero displacement position.

The operation of the servo spool and swashplate is such that first the servo spool moves in response to an increase (or decrease) in reduced pressure, and then the swashplate and follow-up sleeve move in the same direction a fraction of a second later to stabilize at the new servo position; this is explained more completely as follows: With valve 57 closed as shown in FIG. 1 and the swashplate at some angle the pump discharge pressure in conduits 20, 21, 44, 45, will rapidly rise and simultaneously the reduced pressure in 52, 53, 54, and 70 will also rise and move servo spool 49 against the bias of spring 48. This will close the communication of passage 44 with the chamber end of plunger 47 and open a path 56 to reservoir 25 venting pressurized fluid, thereby allowing the pressure in 45 acting on piston 46 to move the swashplate 19 towards the zero displacement position. As swashplate, plunger 47, and attached piston 47A move towards zero the free end of piston 47A abuts plate 101, which is fixed into follow-up sleeve 49A, and all these parts move against bias of spring 48A in the direction the servo spool 49 moved. When the servo spool 49 stops at any position due to balance of forces (reduced pressure on enlargement 55 equals bias of spring 48) then within a fraction of a second the swashplate 19, plunger 47, 47A, 101, and follow up sleeve 49A, catch up with the servo spool, so that: the communication area of passage 44 to plunger 47 and the area of path 56 to reservoir will adjust so the pressure in the chamber end of 47 is just sufficient to keep the swashplate 19 and elements 47, 47A, 101 and 49A centered on the new servo spool 49 position. As a result, the pump displacement will eventually stabilize, near zero displacement, delivering only sufficient flow to the fluid delivery system to maintain 2,100 psi therein when all the control valves 23 are in neutral.

If the illustrated control valve 23 is now actuated by moving its spool 57, the pressure in the fluid delivery conduit 21 would drop, at least initially, causing the pump to increase displacement to meet the additional flow demands of the circuit, since pressurized fluid in conduit 21 passing flow control spool 58, has opened a valve inlet 59 by the action of the fluid pressure on one end of this spool through passage 58a, thereby overcoming spring 60.

Assuming valve spool 57 is shifted to pressurize conduit 32 connected to one of the ports 30, load L' resisting the movement of the piston 61 in the jack 39 would be opposed, as shuttle 43 and ball 42 are displaced in the opposite direction by the fluid pressure in conduit 32. If the force of load L' resisting movement of the piston requires less than 1,700 psi in the fluid delivery circuit, the swash plate 19 will adjust for full displacement. Thereafter a decrease in displacement will occur as the pressure increases in the fluid delivery circuit from 1,700 psi to approximately 1,800 psi due to an increased resisting force of load L'. As pump pressure reaches 2,050 psi (about 1,850 psi in the fluid delivery circuit), due to increased loading of the jack, the dual compensating feature of the invention activates.

This is accomplished by communicating pressure from the pressurized port 30 of valve 23 through passage 62 having a ball check 63 closing a corresponding path to the exhausting port 30, to the chamber 64 containing spring 60 and thence to a compensator valve 65 via a one-way check valve 66 and a conduit 67. All the valves 23 are commonly connected through conduit 67, as illustrated in FIG. 1 and would function in the same manner as now described.

The compensator valve includes a spool 68 biased against the pressure in conduit 67 by a spring 69, which spool controls the fluid communication between the passage 53 in the pump via conduit 70 and one end of a plunger 71 via conduit 72. The inner end of this plunger is abutted on the spring end of spool 49. Thus if the pressure in conduit 67 overcomes the bias on the spool 68, reduced pressure from passage 53 is communicated to the outboard end of the plunger and decreases the biasing force on spool 49 so the previously described pump displacement control will now operate in the same manner, but between a pressure range of 2,050 and 3,600 when either load L or L' requires such a pressure range in the fluid delivery circuit. The relief valve 27 opens at 3,650 psi to prevent over pressures in the fluid delivery circuit.

It can be appreciated that all the valves 23 are arranged to provide the dual range pressure compensation being commonly connected to conduit 67 and a small orifice 73 drains the fluid from this conduit when the level drops below 1,850 psi in the fluid delivery circuit downstream of valves 23.

By the described arrangement the horsepower requirements are maintained low until higher pressure is required in one or more of the work circuits connected to the fluid delivery circuit.

Figure 2:
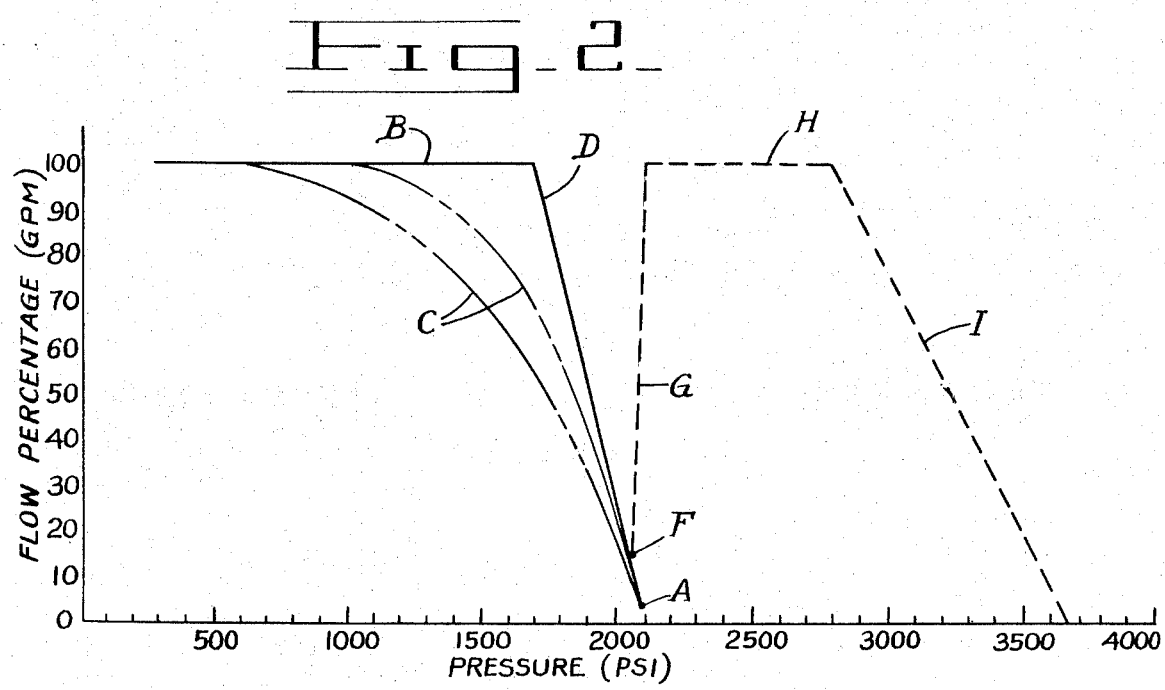
FIG. 2 is a graph illustrating the flow percentage of the pump versus pressure.

By referring to FIG. 2 the operation of the dual compensation is readily apparent. Assuming the control valve 23 is in neutral, the pump operates at 2,150 psi (point A) with nominal pump displacement to account for leakage in the circuits. Operating one of the spools 57 will usually result in an initial pressure drop, causing the displacement/pressure curve to move to line B, if the pressure drops to below 1,700 psi, as indicated by the broken lines C. Thereafter the displacement/pressure profile will move along line B with increasing pressure in the fluid delivery circuit to line D and thence downward toward point A. However, as point A is approached the spool 68 shifts at point F increasing the pump to full displacement at approximately 2,050 psi pump pressure along broken line G due to the increased bias provided by plunger 71. Pressure thereafter can increase along broken line H with the pump at full displacement until broken line I is intercepted at which time displacement decreases as pressure increases from 2,800 psi to 3,600 psi. Thus, through the additional bias on spool 49 by plunger 71, the second range of pressure compensation is automatically achieved when needed in the work circuits connected to the fluid delivery circuit.

Figure 3:
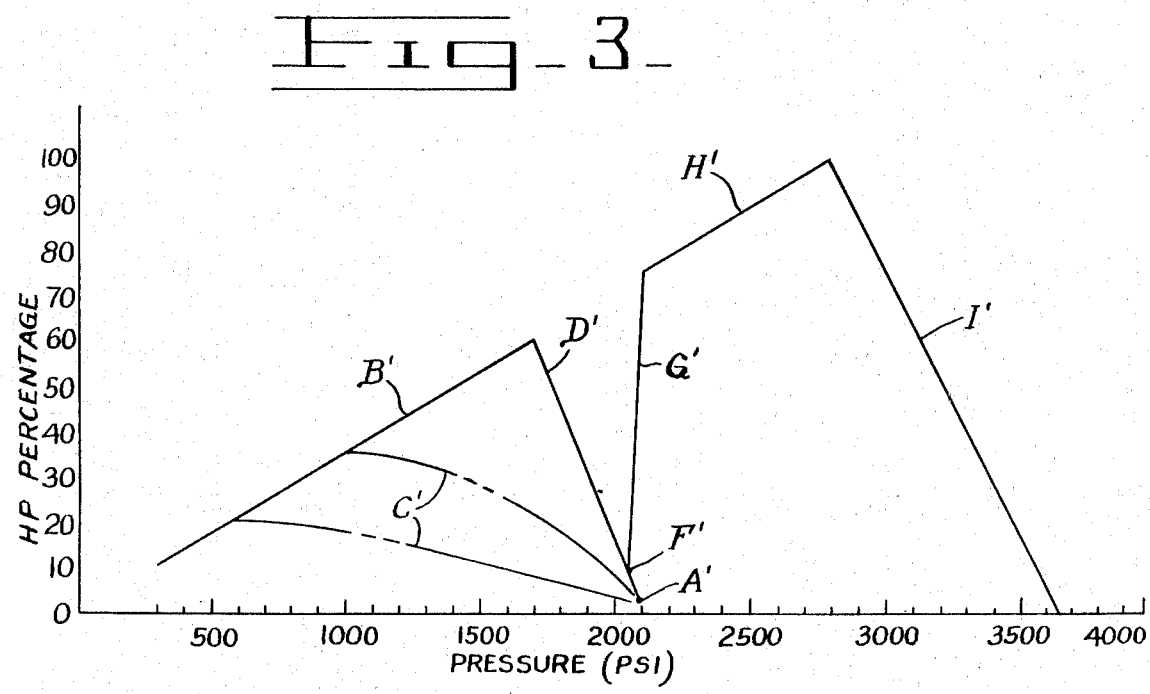
FIG. 3 is a corresponding graph having a horsepower percentage on one ordinate with the same pressure scale on the other ordinate as the graph of FIG. 2.

The advantage of the invention can be appreciated by reviewing the horsepower (H.P. percentage) pressure envelope of FIG. 3 designated by A', C', B', D' and F' with the corresponding displacement (flow percentage)/pressure envelope A, C, B, D and F of FIG. 2 along with a comparison of the F', G', H' and I' envelope with the F, G, H and I envelope of FIG. 2. Obviously when the work requirements can be satisfied at the low pressure compensated range, an economical benefit is realized, with the dual pressure compensated arrangement, since it is not necessary to work at the high pressure compensated range requiring more horsepower. Obviously, the capacity of the pump must be adequate to meet the demands of the several circuits and this is assumed in the above description.

What is claimed is:

1. A dual range pressure compensated fluid delivery system giving pressure compensated output flow over two independent pressure ranges comprising:
   a variable displacement pump driven by a prime mover and having an inlet connected to a source of hydraulic fluid and an outlet delivering pressurized fluid;
   a fluid delivery circuit connected to said output having at least one work circuit connected thereto;
   an actuator system connected to said pump to control its displacement,
   pressure responsive control means operably associated with said actuator system and having communication with said outlet of said pump whereby an output flow of said pump is proportional to its outlet pressure over a part of its displacement within a first preselected pressure range; and
   pressure responsive valve means in communication with pressure in said fluid delivery circuit and associated with said pressure responsive control means, said pressure responsive valve means operable above a preselected pressure to adjust said control means whereby said output flow of said pump is proportional to its outlet over part of its displacement within a second preselected pressure range, said second preselected pressure range being higher than said first preselected pressure range.

2. The dual range pressure compensated fluid delivery system defined in claim 1 wherein the variable displacement pump is of the axial piston type.

3. The dual range pressure compensated fluid delivery system defined in claim 1 wherein the fluid delivery circuit includes at least one closed center valve between the fluid delivery circuit and at least one work circuit.

4. The dual range pressure compensated fluid delivery system defined in claim 3 wherein the pressure responsive valve means is in communication with a portion of the fluid delivery circuit downstream of said at least one closed center valve.

5. The dual range pressure compensated fluid delivery system defined in claim 4 wherein a locking valve is disposed between the fluid delivery circuit and at least one work circuit whereby pressures in a hydraulic motor in said work circuit cannot activate the pressure responsive valve means unless its associated closed center control valve is actuated.

6. The dual range pressure compensated fluid delivery system defined in claim 3 wherein a plurality of closed center control valves are disposed between the fluid delivery circuit and a corresponding number of work circuits, each control valve operable to actuate a separate work circuit, and common conduit means connecting each of the control valves with the pressure responsive valve means through one way check valves whereby any work circuit activated can operate said pressure responsive valve means.

7. The dual range pressure compensated fluid delivery system defined in claim 1 wherein the actuator system includes two pressure responsive members, one of said pressure responsive members in communication with pump output pressure and having biasing means associated therewith and wherein the pressure responsive control means includes a servo-valve means associated with one of said pressure responsive members operable to control the actuator system as a function of said pump output pressure.

8. The dual range pressure compensated fluid delivery system defined in claim 7 wherein the pressure responsive valve means activates additional biasing means on the servo-valve means thereby causing the pump to operate within the second preselected pressure range.

9. The dual range pressure compensated fluid delivery system defined in claim 7 wherein the additional biasing means includes a reacting surface operated by pump pressure.

* * * * *

UNITED STATES PATENT OFFICE
CERTIFICATE OF CORRECTION

Patent No. 3,797,245      Dated March 19, 1974

Inventor(s) Allyn J. Hein

It is certified that error appears in the above-identified patent and that said Letters Patent are hereby corrected as shown below:

On the title page, line 2, please change

"[75] Inventor: Arthur J. Hein, Joliet, Ill."

to read as follows:

--[75] Inventor: Allyn J. Hein, Joliet, Ill.--

Signed and sealed this 13th day of August 1974.

(SEAL)
Attest:

McCOY M. GIBSON, JR.
Attesting Officer

C. MARSHALL DANN
Commissioner of Patents